United States Patent
Gladden et al.

(12) 
(10) Patent No.: US 6,301,889 B1
(45) Date of Patent: Oct. 16, 2001

(54) TURBOCHARGER WITH EXHAUST GAS RECIRCULATION

(75) Inventors: John R. Gladden; Phillip J. Houtz, both of Lafayette, IN (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 09/666,709

(22) Filed: Sep. 21, 2000

(51) Int. Cl.[7] ....................................... F02B 33/44
(52) U.S. Cl. ............... 60/605.2; 60/612; 416/168 A; 417/407; 417/409; 415/120
(58) Field of Search ................... 60/605.2, 612; 417/409, 407; 416/198 A; 415/120

(56) References Cited

U.S. PATENT DOCUMENTS

| | | | |
|---|---|---|---|
| 1,213,889 | * | 1/1917 | Lawaczek ............................ 415/120 |
| 3,941,506 | * | 3/1976 | Robb et al. ....................... 416/198 A |
| 4,082,477 | * | 4/1978 | Kronogard ........................... 415/120 |
| 4,250,711 | | 2/1981 | Zehnder . |
| 5,937,650 | * | 8/1999 | Arnold ................................ 60/605.2 |
| 6,145,313 | * | 11/2000 | Arnold ................................ 60/605.2 |
| 6,209,324 | * | 4/2001 | Daudel et al. ...................... 60/605.2 |
| 6,216,459 | * | 4/2001 | Daudel et al. ...................... 60/605.2 |

FOREIGN PATENT DOCUMENTS

| | | | | |
|---|---|---|---|---|
| 998179 | * | 1/1952 | (FR) | ..................................... 417/409 |
| 1155263 | * | 4/1958 | (FR) | ..................................... 417/409 |
| 60-162050-A | * | 8/1985 | (JP) | ..................................... 417/409 |

* cited by examiner

Primary Examiner—Thomas Denion
Assistant Examiner—Thai-Ba Trieu
(74) Attorney, Agent, or Firm—Todd T. Taylor

(57) ABSTRACT

A turbocharger, particularly suitable for use in an internal combustion engine, recirculates exhaust gas from the turbine to an interstage duct area between two compressor wheels of a multi-stage compressor. The turbocharger includes a rotatable shaft; a turbine including a turbine wheel carried by the shaft; and a multi-stage compressor. The multi-stage compressor includes a first compressor wheel carried by the shaft, an axially extending first inlet associated with the first compressor wheel, and a radially extending first outlet associated with the compressor wheel. A second compressor wheel carried by the shaft includes an axially extending second inlet associated with the second compressor wheel, and a radially extending second outlet associated with the second compressor wheel. An interstage duct fluidly interconnects in series the first outlet associated with the first compressor wheel and a second inlet associated with the second compressor wheel. An exhaust gas recirculation duct fluidly interconnects the turbine with the interstage duct. A valve is positioned within the exhaust gas recirculation duct.

29 Claims, 1 Drawing Sheet

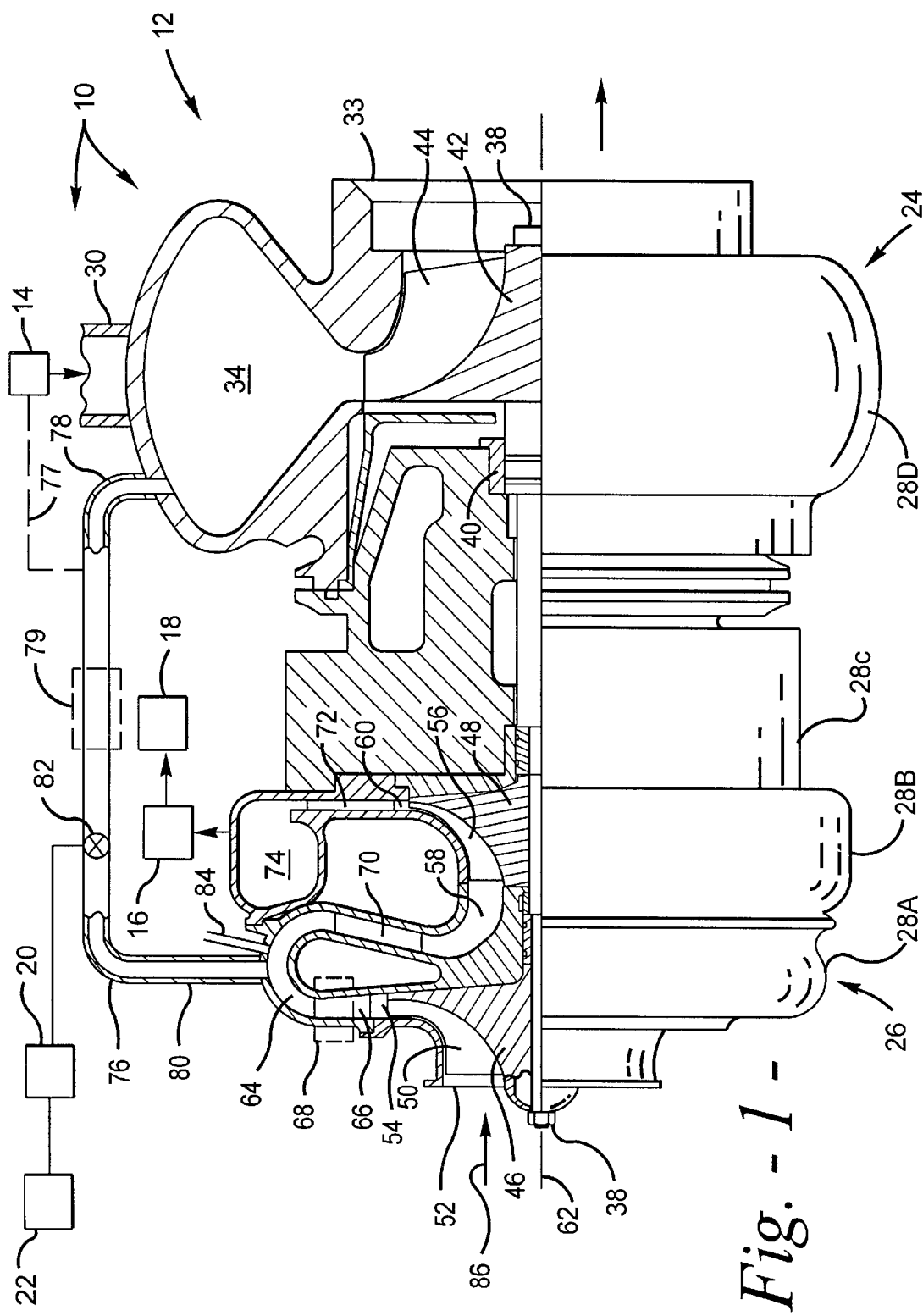
Fig. -1-

TURBOCHARGER WITH EXHAUST GAS RECIRCULATION

TECHNICAL FIELD

The present invention relates to turbochargers for use in an internal combustion engine, and, more particularly, to a turbocharger having a turbine and a multi-stage compressor.

BACKGROUND ART

An internal combustion engine may include one or more turbochargers for compressing a fluid which is supplied to one or more combustion chambers within corresponding combustion cylinders. Each turbocharger typically includes a turbine driven by exhaust gases of the engine and a compressor which is driven by the turbine. The compressor receives the fluid to be compressed and supplies the fluid to the combustion chambers. The fluid which is compressed by the compressor may be in the form of combustion air or a fuel and air mixture.

A turbocharger may also include a two stage compressor with two separate compressor wheels which are carried and driven by a common shaft. U.S. Pat. No. 4,344,289 (Curiel et al.) discloses a supercharger with a two-stage compressor having two compressor wheels which are disposed in a back-to-back orientation relative to each other and carried by a common shaft. The hub portions of the two compressor wheels are configured differently relative to each other, but the overall diameter of the compressor wheels at the outside diameter of the blades is the same. The two compressor wheels and the common shaft appear to be monolithically formed with each other. Since the compressor wheels have the same diameter, the stress capacity of the compressor wheels is limited by the common material from which they are constructed. Moreover, the rotational inertia of the entire compressor assembly can only be altered by changing the geometry of the compressor wheels since they are constructed from a common material.

An exhaust gas recirculation (EGR) system is used for controlling the generation of undesirable pollutant gases and particulate matter in the operation of internal combustion engines. Such systems have proven particularly useful in internal combustion engines used in motor vehicles such as passenger cars, light duty trucks, and other on-road motor equipment. EGR systems primarily recirculate the exhaust gas by-products into the intake air supply of the internal combustion engine. The exhaust gas which is reintroduced to the engine cylinder reduces the concentration of oxygen therein and increases the specific heat of the mixture, which in turn lowers the maximum combustion temperature within the cylinder, decreasing the formation of nitrous oxides (NOx). Furthermore, the exhaust gases typically contain unburned hydrocarbons which are burned on reintroduction into the engine cylinder, which further reduces the emission of exhaust gas by-products which would be emitted as undesirable pollutants from the internal combustion engine.

It is known to recirculate the exhaust gas within a turbocharger in an internal combustion engine. For example, U.S. Pat. No. 4,250,711 (Zehnder) discloses a supercharger for an internal combustion engine with exhaust gas recirculation. The supercharger includes a single turbine wheel and a single compressor wheel. The turbine is in the form of an axial turbine which is driven by exhaust gas from an exhaust manifold of the internal combustion engine. A portion of the exhaust gas may be recirculated from the turbine side to the compressor side of the supercharger. More particularly, the exhaust gas is recirculated to the discharge side of the single stage compressor either immediately prior to the diffuser section or within the volute section. A single stage compressor as shown in Zehnder, 711 has limited compression capabilities, primarily dependent upon the configuration and rotational speed of the compressor wheel.

The present invention is directed to overcoming one or more of the problems as set forth above.

DISCLOSURE OF THE INVENTION

In one aspect of the invention, a turbocharger for an internal combustion engine is provided with a rotatable shaft; a turbine including a turbine wheel carried by the shaft; and a multi-stage compressor. The multi-stage compressor includes a first compressor wheel carried by the shaft, an axially extending first inlet associated with the first compressor wheel, and a radially extending first outlet associated with the compressor wheel. A second compressor wheel carried by the shaft includes an axially extending second inlet associated with the second compressor wheel, and a radially extending second outlet associated with the second compressor wheel. An interstage duct fluidly interconnects in series the first outlet associated with the first compressor wheel and a second inlet associated with the second compressor wheel. An exhaust gas recirculation duct fluidly interconnects the turbine with the interstage duct. A valve is positioned within the exhaust gas recirculation duct.

In another aspect of the invention, an internal combustion engine includes an intake manifold and a turbocharger. The turbocharger includes a rotatable shaft; a turbine including a turbine wheel carried by the shaft; and a multi-stage compressor. The multi-stage compressor includes a first compressor wheel carried by the shaft, an axially extending first inlet associated with the first compressor wheel, and a radially extending first outlet associated with the first compressor wheel. A second compressor wheel carried by the shaft includes an axially extending second inlet associated with the second compressor wheel, and a radially extending second outlet associated with the second compressor wheel. The second outlet is in fluid communication with the intake manifold. An interstage duct fluidly interconnects in series the first outlet associated with the first compressor wheel and the second inlet associated with the second compressor wheel. An exhaust gas recirculation duct fluidly interconnects the turbine with the interstage duct. A valve is positioned within the exhaust gas recirculation duct.

In yet another aspect of the invention, a method of operating a turbocharger in an internal combustion engine is provided with the steps of: providing a turbine including a turbine wheel carried by the shaft; providing a multi-stage compressor including a first compressor wheel carried by the shaft, an axially extending first inlet associated with the first compressor wheel, a radially extending first outlet associated with the first compressor wheel, a second compressor wheel carried by the shaft, an axially extending second inlet associated with the second compressor wheel, and a radially extending second outlet associated with the second compressor wheel; fluidly connecting in series the first outlet associated with the first compressor wheel with the second inlet associated with the second compressor wheel using an interstage duct; fluidly interconnecting the turbine with the interstage duct using an exhaust gas recirculation duct; positioning a valve within the exhaust gas recirculation duct; rotating the turbine wheel, the first compressor wheel and the second compressor wheel carried by the shaft; and selectively actuating the valve to recirculate exhaust gas from the turbine to the interstage duct.

BRIEF DESCRIPTION OF THE DRAWINGS

The FIG. 1 is a partially schematic, partially sectioned view of an internal combustion engine including an embodiment of a turbocharger of the present invention.

BEST MODE FOR CARRYING OUT THE INVENTION

Referring now to the drawing, there is shown an internal combustion engine 10 including an embodiment of a turbocharger 12 of the present invention. Additionally, internal combustion engine 10 includes an exhaust manifold 14, aftercooler 16, intake manifold 18, controller 20 and sensor 22.

Turbocharger 12 includes a turbine 24 and a multi-stage compressor 26. Turbocharger 12 includes a multi-part housing 28A, 28B, 28C and 28D. Turbine 24 includes housing part 28D, which in turn defines an inlet 30, outlet 33 and a volute 34. A shaft 38 is rotatably carried by one or more housing parts 28A–28D, as indicated by reduced friction bearing 40 associated with housing part 28C. Shaft 38 carries a turbine wheel 42 having a plurality of turbine blades 44.

Multi-stage compressor 26 includes housing parts 28A and 28B, each of which are respectively associated with a first compressor wheel 46 and a second compressor wheel 48 carried by common shaft 38. First compressor wheel 46 includes a plurality of blades 50. An inlet 52 is disposed at the upstream side of first compressor wheel 46 and an outlet 54 is disposed at the downstream side of first compressor wheel 46. Similarly, second compressor wheel 48 includes a plurality of blades 56. A second inlet 58 is disposed at the upstream side of second compressor wheel 48, and a second outlet 60 is disposed at the downstream side of second compressor wheel 48. First inlet 52 and second inlet 58 each extend in an axial direction relative to longitudinal axis 62 of shaft 38; and first outlet 54 and second outlet 60 each extend in a radial direction relative to axis 62.

An interstage duct 64 interconnects first outlet 54 associated with first compressor wheel 46 with second inlet 58 associated with second compressor wheel 48. A plurality of diffuser vanes 66 are positioned at the downstream side of first outlet 54. Diffuser vanes 66 cause the air flow exiting from first outlet 54 to decrease in velocity and increase in static pressure. A vaneless space with increasing flow area can also be used as a diffuser. An optional intercooler 68 (shown in phantom lines) is disposed in fluid communication with interstage duct 64 and is used to cool the compressed and heated air flowing therethrough. Intercooler 68 may be remotely located. Intercooler 68 may be of conventional design, and thus is not described in further detail. A plurality of deswirler vanes 70 positioned within interstage duct 64 upstream from second inlet 58 reduce the swirling of the air flowing through interstage duct 64, and direct the air into second inlet 58.

A plurality of diffuser vanes 72 are positioned downstream from second outlet 60 associated with second compressor wheel 48. Diffuser vanes 72 function similarly to diffuser vanes 66, and thereby cause a decreased velocity and increased static pressure in the air flow exiting from second outlet 60. A volute 74 on the downstream side of diffuser vanes 72 discharges the compressed air to intake manifold 18 via aftercooler 16.

According to an aspect of the present invention, an exhaust gas recirculation (EGR) duct 76 fluidly interconnects turbine 24 with interstage duct 64. More particularly, in the embodiment shown, EGR duct 76 includes an inlet end 78 disposed in fluid communication with volute 34, and an outlet end 80 terminating at and in fluid communication with interstage duct 64. A valve 82 is positioned within EGR duct 76. Valve 82 is coupled with and controllably actuated by controller 20, which in turn receives an input signal from sensor 22. In the embodiment shown, sensor 22 is configured to sense at least one of engine speed, engine load, boost pressure, ambient environment pressure, ambient environment temperature, coolant temperature, aftercooler temperature, fuel rate, fuel rate command, and an engine start condition. Such operating parameters associated with internal combustion engine 10 are known to affect a desired amount of exhaust gas which is recirculated to the combustion air transported to intake manifold 18. Valve 82 may be controlled by movement between a first position to fully close EGR duct 76, a second position to fully open EGR duct 76 or any position therebetween. A cooler 79 may be optionally provided to cool exhaust gas flowing through EGR duct 76.

A fluid wash injector 84 may also be optionally provided within interstage duct 64. Since introduction of exhaust gas into interstage duct 64 may cause fouling to some extent of mechanical components located downstream thereof, fluid wash injector 84 lessens or eliminates an extent to which fouling may occur. In the embodiment shown, fluid wash injector 84 is positioned between outlet end 80 of EGR duct 76 and deswirler vanes 70. However, the exact location of fluid wash injector 84 and/or the number of fluid wash injectors may vary depending upon a specific application with which turbocharger 12 is utilized. Additionally, the particular type of fluid wash may vary, such as water, a solvent, etc.

In the embodiment shown, multi-stage compressor 26 is configured with two compressor wheels 46 and 48, which each face in a common direction away from turbine 24. First compressor wheel 26 provides a pressure ratio of between about 1.5:1 and 4.5:1 at first outlet 54; and second compressor wheel 48 provides an additional pressure ratio of between 1.05:1 and 3.5:1 at second outlet 60 at full load. Of course, it will be appreciated that the diameter of each of first compressor wheel 46 and second compressor wheel 48, as well as the particular configuration of blades 50 and 56 may be altered to provide different pressure ratios, dependent upon the specific application with which turbocharger 12 is utilized.

INDUSTRIAL APPLICABILITY

During use, exhaust gas is transported from exhaust manifold 14 and into volute 34 of turbine 24 via inlet 30. The exhaust gas flow is accelerated and impinges upon turbine blades 44, thereby causing rotation of turbine wheel 42 carried by shaft 38. The exhaust gas exits via outlet 33 and flows to a muffler system (not shown) downstream from turbocharger 12. Rotation of shaft 38 causes rotation of first compressor wheel 46 and second compressor wheel 48 carried thereby. Ambient air is drawn into first inlet 52, as indicated by arrow 86. Blades 50 of first compressor wheel 46 accelerate the air flow to first outlet 54. The accelerated air impinges upon diffuser vanes 66, resulting in a decreased velocity and increased pressure. Intercooler 68 cools the heated and compressed air flowing through interstage duct 64. Valve 82 is controllably actuated by controller 20, dependent upon an input sensor signal from sensor 22 as described above, such that exhaust gas is recirculated from volute 34 (and/or optionally from exhaust manifold 14 as indicated by phantom line 77) to interstage duct 64 via EGR duct 76. Fluid wash injector 84 injects a fluid wash, such as water or a solvent, downstream from EGR duct 76 to reduce or eliminate fouling of downstream components. Deswirler vanes 70 reduce the swirling action of the air flowing through interstage duct 64 and direct the air into second inlet 58 associated with second compressor wheel 48. Blades 56 of second compressor wheel 48 accelerate the air/EGR mixture to second outlet 60 where the high velocity mixture impinges upon diffuser vanes 72, resulting in an increased pressure. The compressed mixture then flows into volute 74. From volute 74 the mixture flows through intake manifold 18 via aftercooler 16.

The present invention provides a method of recirculating exhaust gas to the intake manifold which is relatively simple in design and has an improved efficiency. Rather than injecting the exhaust gas upstream from the multi-stage compressor which results in a reduced work efficiency and increased fouling, or downstream from the multi-stage compressor where the pressure is highest, exhaust gas is reintroduced into the interstage duct between the first compressor wheel and the second compressor wheel. Since the pressure ratio within the interstage duct is lower than at the downstream side of the multi-stage compressor, the exhaust gas may be more easily introduced into the air flow stream. A fluid wash injector may be provided within the interstage duct to reduce or eliminate fouling of mechanical components located downstream from the EGR recirculation location.

What is claimed is:

1. A turbocharger for an internal combustion engine, comprising:
    a rotatable shaft;
    a turbine including a turbine wheel carried by said shaft;
    a multi-stage compressor including a first compressor wheel carried by said shaft, an axially extending first inlet associated with said first compressor wheel, a radially extending first outlet associated with said first compressor wheel, a second compressor wheel carried by said shaft, a second inlet associated with said second compressor wheel, and a radially extending second outlet associated with said second compressor wheel;
    an interstage duct fluidly interconnecting in series said first outlet associated with said first compressor wheel with said second inlet associated with said second compressor wheel;
    an exhaust gas recirculation duct fluidly interconnecting said turbine with said interstage duct; and
    a valve positioned within said exhaust gas recirculation duct.

2. The turbocharger of claim 1, wherein said turbine includes an inlet, an outlet and at least one volute, said exhaust gas recirculation duct interconnecting one of said inlet, said outlet and said volute with said interstage duct.

3. The turbocharger of claim 2, wherein said exhaust gas recirculation duct interconnects one said volute with said interstage duct.

4. The turbocharger of claim 1, wherein said valve is a one-way valve.

5. The turbocharger of claim 1, wherein said valve is movable to and between a first position to fully close said exhaust gas recirculation duct and a second position to fully open said exhaust gas recirculation duct.

6. The turbocharger of claim 1, including a controller coupled with said valve to selectively move said valve between said first position and said second position.

7. The turbocharger of claim 6, including a sensor for sensing at least one of engine speed, engine load, boost pressure, ambient environment pressure, ambient environment temperature, coolant temperature, aftercooler temperature, fuel rate, fuel rate command, and an engine start-up condition, said sensor coupled with and providing an output signal to said controller, said controller selectively moving said valve dependent upon said sensor signal.

8. The turbocharger of claim 1, including an intercooler in communication with said interstage duct, said intercooler positioned upstream from said exhaust gas recirculation duct relative to a flow direction through said interstage duct.

9. The turbocharger of claim 1, including a fluid wash injector in communication with said interstage duct, said fluid wash injector positioned downstream from said exhaust gas recirculation duct relative to a flow direction through said interstage duct.

10. The turbocharger of claim 1, wherein each of said first compressor wheel and said second compressor wheel face in a common direction.

11. The turbocharger of claim 10, wherein each of said first compressor wheel and said second compressor wheel face in a common direction away from said turbine.

12. The turbocharger of claim 1, wherein said first compressor wheel provides a pressure ratio of between about 1.5:1 and 4.5:1, and said second compressor wheel provides an additional pressure ratio of between about 1.05:1 and 3.5:1.

13. The turbocharger of claim 1, further comprising at least one housing defining said first inlet, said first outlet, said second inlet, said second outlet and said interstage duct.

14. The turbocharger of claim 13, wherein said at least one housing includes multiple housing parts.

15. An internal combustion engine, comprising:
    an exhaust manifold;
    an intake manifold; and
    a turbocharger including:
        a rotatable shaft;
        a turbine including a turbine wheel carried by said shaft;
        a multi-stage compressor including a first compressor wheel carried by said shaft, an axially extending first inlet associated with said first compressor wheel, a radially extending first outlet associated with said first compressor wheel, a second compressor wheel carried by said shaft, a second inlet associated with said second compressor wheel, and a radially extending second outlet associated with said second compressor wheel, said second outlet being in fluid communication with said intake manifold;
        an interstage duct fluidly interconnecting in series said first outlet associated with said first compressor wheel with said second inlet associated with said second compressor wheel;
        an exhaust gas recirculation duct fluidly interconnecting said interstage duct with at least one of said turbine and said exhaust manifold; and
        a valve positioned within said exhaust gas recirculation duct.

16. The internal combustion engine of claim 15, wherein said turbine includes an inlet, an outlet and at least one volute, said exhaust gas recirculation duct interconnecting one of said inlet, said outlet and said volute with said interstage duct.

17. The internal combustion engine of claim 16, wherein said exhaust gas recirculation duct interconnects one said volute with said interstage duct.

18. The internal combustion engine of claim 15, wherein said valve is a one-way valve.

19. The internal combustion engine of claim 15, wherein said valve is movable to and between a first position to fully close said exhaust gas recirculation duct and a second position to fully open said exhaust gas recirculation duct.

20. The internal combustion engine of claim 15, including a controller coupled with said valve to selectively move said valve between said first position and said second position.

21. The internal combustion engine of claim 20, including a sensor for sensing at least one of engine speed, engine load, boost pressure, ambient environment pressure, ambient environment temperature, coolant temperature, aftercooler temperature, fuel rate, fuel rate command, and an engine start-up condition, said sensor coupled with and providing an output signal to said controller, said controller selectively moving said valve dependent upon said sensor signal.

22. The internal combustion engine of claim 15, including an intercooler in communication with said interstage duct, said intercooler positioned upstream from said exhaust gas recirculation duct relative to a flow direction through said interstage duct.

23. The internal combustion engine of claim 15, including a fluid wash injector in communication with said interstage duct, said fluid wash injector positioned downstream from said exhaust gas recirculation duct relative to a flow direction through said interstage duct.

24. The internal combustion engine of claim 15, wherein each of said first compressor wheel and said second compressor wheel face in a common direction away from said turbine.

25. The internal combustion engine of claim 15, including a cooler coupled with said exhaust gas recirculation duct.

26. A method of operating a turbocharger in an internal combustion engine, comprising the steps of:

providing a turbine including a turbine wheel carried by said shaft;

providing a multi-stage compressor including a first compressor wheel carried by said shaft, an axially extending first inlet associated with said first compressor wheel, a radially extending first outlet associated with said first compressor wheel, a second compressor wheel carried by said shaft, an axially extending second inlet associated with said second compressor wheel, and a radially extending second outlet associated with said second compressor wheel;

fluidly interconnecting in series said first outlet associated with said first compressor wheel with said second inlet associated with said second compressor wheel using an interstage duct;

fluidly interconnecting said turbine with said interstage duct using an exhaust gas recirculation duct;

positioning a valve within said exhaust gas recirculation duct;

rotating said turbine wheel, said first compressor wheel and said second compressor wheel carried by said shaft; and selectively actuating said valve to recirculate exhaust gas from said turbine to said interstage duct.

27. The method of claim 26, including the step of providing a controller coupled with said valve, said selectively actuating step including selectively moving said valve between a first position opening said exhaust gas recirculation duct and a second position closing said exhaust gas recirculation duct using said controller.

28. The method of claim 27, including the step of sensing an operating parameter corresponding to at least one of engine speed, engine load, boost pressure, ambient environment pressure, ambient environment temperature, coolant temperature, aftercooler temperature, and an engine start-up condition using a sensor, said selectively actuating step including selectively moving said valve with said controller dependent upon said sensed operating parameter.

29. The method of claim 26, wherein said turbine includes an inlet, an outlet and at least one volute, said fluidly interconnecting step including interconnecting one said volute with said interstage duct using said exhaust gas recirculation duct.

\* \* \* \* \*